(12) United States Patent
    Bai

(10) Patent No.: US 10,785,392 B2
(45) Date of Patent: Sep. 22, 2020

(54) ELECTRONIC DEVICE AND CAMERA ASSEMBLY THEREOF

(71) Applicant: GUANGDONG OPPO MOBILE TELECOMMUNICATIONS CORP., LTD., Dongguan, Guangdong (CN)

(72) Inventor: Jian Bai, Guangdong (CN)

(73) Assignee: GUANGDONG OPPO MOBILE TELECOMMUNICATIONS CORP., LTD, Dongguan, Guangdon (CN)

( * ) Notice: Subject to any disclaimer, the term of this patent is extended or adjusted under 35 U.S.C. 154(b) by 0 days.

(21) Appl. No.: 16/561,433

(22) Filed: Sep. 5, 2019

(65) Prior Publication Data

US 2019/0394370 A1    Dec. 26, 2019

Related U.S. Application Data

(63) Continuation of application No. 16/382,771, filed on Apr. 12, 2019.

(30) Foreign Application Priority Data

Apr. 24, 2018  (CN) .......................... 2018 1 0376511

(51) Int. Cl.
    *H04N 5/225*    (2006.01)
    *H04N 5/232*    (2006.01)
    (Continued)

(52) U.S. Cl.
    CPC ....... *H04N 5/2254* (2013.01); *H04N 5/23241* (2013.01); *G02B 5/208* (2013.01); *H04M 1/0264* (2013.01)

(58) Field of Classification Search
    CPC ............. H04N 5/2254; H04N 5/23241; H04N 5/2253; H04M 1/0264; G02B 5/208
    See application file for complete search history.

(56) References Cited

U.S. PATENT DOCUMENTS 9,661,213 B2    5/2017  Kim
2011/0159919 A1  6/2011  Kim
    (Continued)

FOREIGN PATENT DOCUMENTS

CN    202798942 U    3/2013
CN    203261373 U    10/2013
    (Continued)

OTHER PUBLICATIONS

First Chinese Office Action dated Feb. 25, 2019; Appln. No. 201810376511.1.
    (Continued)

*Primary Examiner* — Christopher K Peterson

(57) ABSTRACT

A camera assembly is provided. The camera assembly includes a lens holder, a lens disposed in the lens holder, a circuit board, a camera sensor disposed on the circuit board, and an ambient light sensor electrically connected to the circuit board. The lens holder defines a light transmission channel, an inner peripheral wall is defined in the light transmission channel, and a chamfer is formed in the lens holder and disposed at one end of the inner peripheral wall that faces towards the lens, and the camera sensor is disposed correspondingly to the lens via the light transmission channel. The ambient light sensor is attached to a surface of the chamfer. Ambient light is transmitted through the lens and the light transmission channel, and is further incident into the camera sensor and the ambient light sensor. An electronic device having the camera assembly is further disclosed.

10 Claims, 5 Drawing Sheets

(51) Int. Cl.
*H04M 1/02* (2006.01)
*G02B 5/20* (2006.01)

(56) References Cited

U.S. PATENT DOCUMENTS

| | | | |
|---|---|---|---|
| 2012/0092541 A1 | 4/2012 | Tuulos et al. | |
| 2013/0076965 A1 | 3/2013 | Dabov | |
| 2014/0313403 A1 | 10/2014 | Chen | |
| 2015/0334316 A1* | 11/2015 | Wang | H04N 5/2254 348/143 |
| 2018/0124327 A1 | 5/2018 | Alasirnio et al. | |

FOREIGN PATENT DOCUMENTS

| | | |
|---|---|---|
| CN | 103515371 A | 1/2014 |
| CN | 106161885 A | 11/2016 |
| CN | 106657485 A | 5/2017 |
| CN | 106850898 A | 6/2017 |
| CN | 106878564 A | 6/2017 |
| CN | 107135341 A | 9/2017 |
| CN | 107222664 A | 9/2017 |
| CN | 107483795 A | 12/2017 |
| CN | 107734243 A | 2/2018 |
| CN | 108391038 A | 8/2018 |
| KR | 1020140022224 A | 2/2014 |

OTHER PUBLICATIONS

International search report dated Jul. 10, 2019; PCT/CN2019/083482.
European search report, dated Aug. 13, 2019; Appln. No. 19170545.8.
Notification to Grant Patent; dated Apr. 19, 2019; Appln. No. 201810376511.1.
Indian examination report, 201914015642, dated May 14, 2020 (5 pages).
Non Final Action from United States Patent and Trademark Office in a counterpart U.S. Appl. 16/382,771, dated Jun. 10, 2020 (17 pages).

* cited by examiner

ELECTRONIC DEVICE AND CAMERA ASSEMBLY THEREOF

CROSS REFERENCE TO RELATED APPLICATIONS

This application is a continuation-application of U.S. patent application Ser. No. 16/382,771 filed on Apr. 12, 2019, which claims priorities to Chinese Patent Application No. 201810376511.1, filed on Apr. 24, 2018, the contents of which are herein incorporated by reference in their entireties.

TECHNICAL FIELD

The present disclosure relates to electronic devices, and in particular, to a camera assembly, and an electronic device including the camera assembly.

BACKGROUND

With the development of technology, portable electronic devices, such as smart phones, tablet computers, and the like, are more and more widely used. At present, a front face of a smart phone or a tablet computer generally defines a first opening for a camera assembly and a second opening for an ambient light sensor. In this way, the screen ratio of the smart phone or the tablet computer is reduced, and thus the user experience is poor.

SUMMARY

In one aspect, the present disclosure provides a camera assembly. The camera assembly may include a lens holder, a lens disposed in the lens holder, a circuit board, a camera sensor disposed on the circuit board, and an ambient light sensor electrically connected to the circuit board. The lens holder defines a light transmission channel, an inner peripheral wall is defined in the light transmission channel, and a chamfer is formed in the lens holder and disposed at one end of the inner peripheral wall that faces towards the lens. The camera sensor is disposed correspondingly to the lens via the light transmission channel. The ambient light sensor is attached to a surface of the chamfer. Ambient light is transmitted through the lens and the light transmission channel, and is further incident into the camera sensor and the ambient light sensor.

In a further aspect, an electronic device may be also provided. The electronic device may include a housing and the camera assembly disposed in the housing. An opening for the camera assembly is defined in the housing. The camera assembly may include a lens holder, a lens disposed in the lens holder and aligned with the opening, a circuit board, a camera sensor disposed on the circuit board, and an ambient light sensor electrically connected to the circuit board. The lens holder defines a light transmission channel, an inner peripheral wall is defined in the light transmission channel, and a chamfer is formed in the lens holder and disposed at one end of the inner peripheral wall that faces towards the lens. The camera sensor is disposed correspondingly to the lens via the light transmission channel. The ambient light sensor is attached to a surface of the chamfer. Ambient light is transmitted through the lens and the light transmission channel, and is further incident into the camera sensor and the ambient light sensor.

BRIEF DESCRIPTION OF THE DRAWINGS

In order to describe the technical solutions in the embodiments of the present disclosure more clearly, the following briefly introduces the accompanying drawings required for describing the embodiments. Apparently, the accompanying drawings in the following description are merely some embodiments of the present disclosure, for those skilled in the art; other drawings can be obtained based on these drawings without creative efforts.

DETAILED DESCRIPTION

Figure 1:
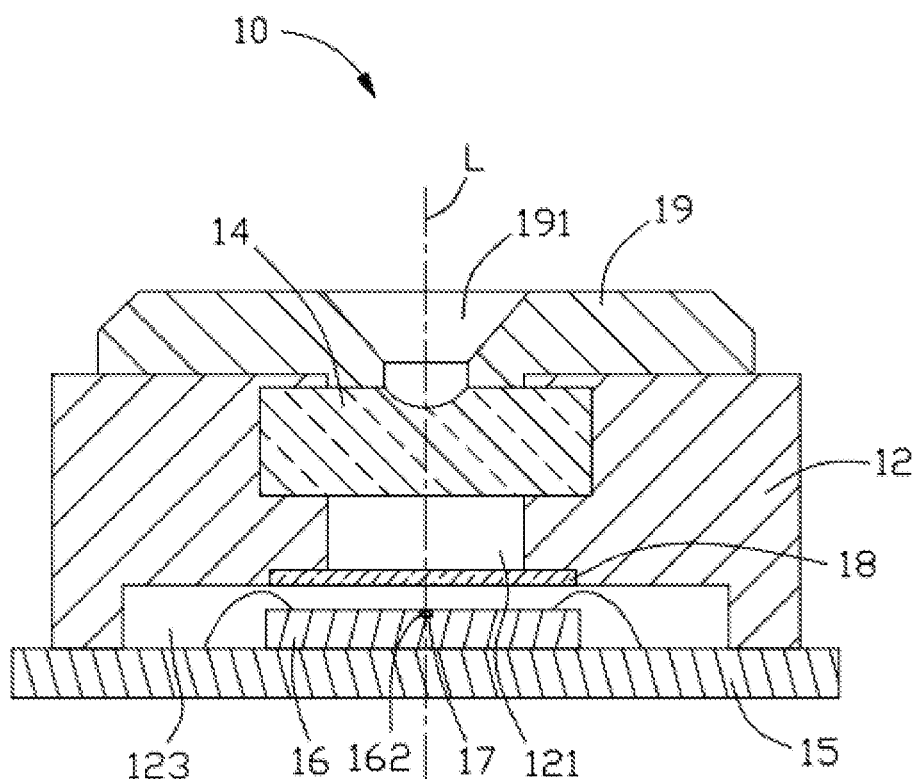
FIG. 1 is a schematic structural view of a camera assembly according to a first embodiment of the present disclosure.

The technical solutions in the embodiments of the present disclosure will be clearly and completely described in detail below with reference to the accompanying drawings in the embodiments of the present disclosure. Apparently, the embodiments described herein are only some exemplary embodiments, not all the embodiments. Based on the embodiments described in the present disclosure, one skilled in the art may acquire all other embodiments without any creative efforts. All these shall be covered within the protection scope of the present disclosure.

In the description of the embodiments of the present disclosure, it should be understood that, it should be understood that, the orientation or positional relationship indicated by the terms "up", "down", "left", "right", and the like, is based on the orientation or positional relationship shown in the drawings, and is merely for convenience of description and for simplifying description, rather than implying or indicating that the device or the component must have a particular orientation or constructed and operated in a particular orientation, and thus these terms cannot to be construed as limiting the present disclosure.

In the description of the embodiments of the present disclosure, it should be understood that, the orientation or positional relationship indicated by the term "thickness" and the like is based on the orientation or positional relationship shown in the drawings, and is merely for convenience of description and for simplifying description, rather than implying or indicating that the device or the component must have a particular orientation or constructed and operated in a particular orientation, and thus these terms cannot to be construed as limiting the present disclosure.

In one aspect, the present disclosure provides a camera assembly. The camera assembly may include a lens holder, a lens disposed in the lens holder, a circuit board, a camera sensor disposed on the circuit board, and an ambient light sensor electrically connected to the circuit board. The lens holder defines a light transmission channel, an inner peripheral wall is defined in the light transmission channel, and a chamfer is formed in the lens holder and disposed at one end of the inner peripheral wall that faces towards the lens. The camera sensor is disposed correspondingly to the lens via the light transmission channel. The ambient light sensor is attached to a surface of the chamfer. Ambient light is transmitted through the lens and the light transmission channel, and is further incident into the camera sensor and the ambient light sensor.

In some embodiments, the ambient light sensor may be attached to a surface of the camera sensor that faces towards the light transmission channel.

In some embodiments, an insertion hole may be defined at one side of the camera sensor that faces towards the light transmission channel, and the ambient light sensor may be embedded in the insertion hole.

In some embodiments, the camera sensor may include a wiring layer and a plurality of photodiodes arrayed on the wiring layer. The insertion hole may be defined in the wiring layer and enclosed by the plurality of the photodiodes.

In some embodiments, the camera sensor may include a wiring layer and a plurality of photodiodes arrayed on the wiring layer. One of the plurality of photodiodes disposed on the wiring layer and aligned with the light transmission channel may be the ambient light sensor.

In some embodiments, the ambient light sensor may be disposed on a surface of the camera sensor that faces towards the lens.

In some embodiments, a center of the ambient light sensor may be aligned with an axis of the lens.

In some embodiments, the lens holder may include an inner peripheral wall forming the light transmission channel. A chamfer may be formed at one end of the inner peripheral wall that is adjacent to the lens, and the ambient light sensor may be attached to the chamfer.

In some embodiments, the lens holder may include an inner peripheral wall forming the light transmission channel. A stepped portion may be formed in the light transmission channel at one end of the inner peripheral wall that is adjacent to the lens, and the infrared filter may be disposed on the stepped portion.

In some embodiments, a receiving hole may be further defined in the stepped portion at one side that is away from the camera sensor. The ambient light sensor may be received in the receiving hole, and the ambient light may be able to be incident into the ambient light sensor.

In some embodiments, a through slot may be defined in the lens holder. A wire may run through the through slot, and be further electrically connected to the ambient light sensor and the circuit board.

In some embodiments, a receiving space may be defined at one side of the lens holder that faces towards the circuit board. The light transmission channel may extend through the lens holder and further communicates with the receiving space.

In some embodiments, the camera assembly may further include an infrared filter disposed on the lens holder. The ambient light may be transmitted through the infrared filter and further incident into the camera sensor and the ambient light sensor.

In some embodiments, the ambient light sensor is a photodiode or a photoresistor.

In some embodiments, the camera sensor and the ambient light sensor share an I2C bus.

In another aspect, a camera assembly may be further provided. The camera assembly may include a lens holder, a lens disposed in the lens holder, a circuit board, a camera sensor disposed on the circuit board, and an ambient light sensor electrically connected to the circuit board. The lens holder defines a light transmission channel. An axis of the lens may coincide with a center line of the light transmission channel and be further aligned with a center of the camera sensor. The ambient light sensor is disposed on the camera sensor or the lens holder. Ambient light is transmitted through the lens and the light transmission channel, and is further incident into the camera sensor and the ambient light sensor.

In some embodiments, the camera sensor may include a wiring layer and a plurality of photodiodes arrayed on the wiring layer. An insertion hole may be enclosed by the plurality of the photodiodes on the wiring layer, and the ambient light sensor may be embedded in the insertion hole. Or, one of the plurality of photodiodes disposed on the wiring layer and aligned with the light transmission channel may be the ambient light sensor.

In some embodiments, the lens holder may include an inner peripheral wall forming the light transmission channel. A chamfer may be formed at one end of the inner peripheral wall that is adjacent to the lens, and the ambient light sensor may be attached to the chamfer. Or, a stepped portion may be formed in the light transmission channel at one end of the inner peripheral wall that is adjacent to the lens, a receiving hole may be further defined in the stepped portion at one side that is away from the camera sensor, and the ambient light sensor may be received in the receiving hole.

In some embodiments, the camera assembly may further include an infrared filter disposed on the lens holder. The infrared filter may be disposed on the stepped portion and attached to the lens.

In a further aspect, an electronic device may be also provided. The electronic device may include a housing and the camera assembly disposed in the housing. An opening for the camera assembly is defined in the housing. The camera assembly may include a lens holder, a lens disposed in the lens holder and aligned with the opening, a circuit board, a camera sensor disposed on the circuit board, and an ambient light sensor electrically connected to the circuit board. The lens holder defines a light transmission channel, and disposed correspondingly to the lens via the light transmission channel. The ambient light sensor is disposed on the camera sensor or the lens holder. Ambient light is transmitted through the lens and the light transmission channel, and is further incident into the camera sensor and the ambient light sensor.

In some embodiments, the camera sensor may include a wiring layer and a plurality of photodiodes arrayed on the wiring layer. The plurality of the photodiodes may enclose an insertion hole on the wiring layer, and the ambient light sensor is embedded in the insertion hole. Or, one of the plurality of photodiodes disposed on the wiring layer and aligned with the light transmission channel may be the ambient light sensor.

In some embodiments, the lens holder may include an inner peripheral wall defined in or forming the light transmission channel. A chamfer may be formed at one end of the inner peripheral wall that is adjacent to the lens, and the ambient light sensor may be attached to the chamfer. Or, a stepped portion may be formed in the light transmission channel at one end of the inner peripheral wall that is adjacent to the lens, a receiving hole may be further defined in the stepped portion at one side that is away from the camera sensor, and the ambient light sensor may be received in the receiving hole.

Figure 2:
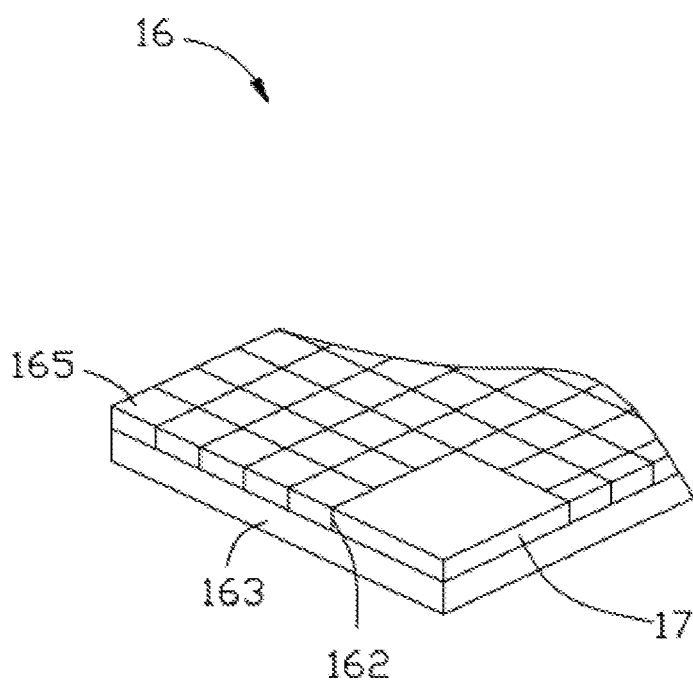
FIG. 2 is a partial perspective structural view of a camera sensor shown in FIG. 1.

FIG. 1 is a schematic structural view of a camera assembly according to a first embodiment of the present disclosure, and FIG. 2 is a partial perspective structural view of a camera sensor shown in FIG. 1. In some embodiments of the present disclosure, a camera assembly 10 may be provided. The camera assembly 10 may include a lens holder 12, a lens 14 disposed in the lens holder 12, a circuit board 15, a camera sensor 16 disposed on the circuit board 15, and an ambient light sensor 17 electrically connected to the circuit board 15. The lens holder 12 may further define a light transmission channel 121. The camera sensor 16 may be disposed correspondingly to the lens 14 via the light transmission channel 121. That is to say, a projection of the camera sensor 16 in the light transmission channel 121 is partially overlapped with a projection of the lens 14 in the light transmission channel 121. The ambient light sensor 17 may be disposed inside the camera sensor 16, and ambient light may be transmitted through the lens 14 and the light transmission channel 121, and may be further incident into the camera sensor 16 and the ambient light sensor 17.

The camera assembly 10 of the present disclosure may be mounted on any electronic device with a display screen. That is, the camera assembly 10 may be installed in smart devices, such as smart phones, tablet computers, notebook computers, in-vehicle devices, network televisions, wearable devices, and the like. In some embodiments, the camera assembly 10 may be used in a smart phone. The ambient light sensor 17 may sense ambient light around the smart phone and send a signal to a processor of the smart phone. The processor may receive the signal and control a backlight luminance of a display screen of the smart phone. In this way, it is possible to reduce the power consumption of the electronic device, and the display screen is capable of displaying a soft picture.

The camera sensor 16 may be a CMOS sensor. In some embodiments, the camera sensor 16 may be a back-illuminated CMOS sensor. The camera sensor 16 may detect light having a wavelength of 400-700 nm.

The ambient light sensor 17 may be a phototransistor, a photoresistor, or a photodiode. In some embodiments, the ambient light sensor 17 is a photodiode, and can detect light having a wavelength of 400-700 nm.

In some embodiments of the present disclosure, the ambient light sensor 17 may be disposed on the camera sensor 16 of the camera assembly 10, and ambient light may be transmitted through the lens 14 and the light transmission channel 121, and further incident into the ambient light sensor 17. In this way, the ambient light sensor 17 may be capable of sensing the ambient light and sending the signal to the processor. The processor may further receive the signal and adjust the backlight luminance of the display screen. Since the ambient light sensor 17 is disposed on the camera sensor 16, only one opening for the camera assembly is required to be defined in a housing of the electronic device having the camera assembly 10. In this case, the camera sensor 16 and the ambient light sensor 17 may sense the light via the opening. That is, there is no need to define a further opening in the housing of the electronic device for the ambient light sensor 17. In this way, the housing of the electronic device has a better integrity, and the ambient light sensor does not occupy a front face of the electronic device any more. Besides, it is beneficial to the increase of the screen ratio of the electronic device.

The lens holder 12 may be made of material such as rubber, plastic, and the like. A receiving space 123 may be defined at one side of the lens holder 12 that faces towards the circuit board 15. The camera sensor 16 may be received in the receiving space 123 and electrically connected to the circuit board 15. The light transmission channel 121 may be defined in the middle of the lens holder 12 along a direction substantially perpendicular to the camera sensor 16. The light transmission channel 121 may extend through the receiving space 123, and further extend to a surface of the lens holder 12 that faces away from the camera sensor 16. That is to say, the light transmission channel 121 may extend through the lens holder 12 and further communicate with the receiving space 123. The lens 14 may be disposed at one side of the lens holder 12 that is away from the camera sensor 16. That is, the camera sensor 16 may be disposed at a bottom side of the lens holder 12, and the lens 14 may be disposed at a top side of the lens holder 12. An axis L of the lens 14 may coincide substantially with a center line of the light transmission channel 121, and be aligned with a center of the camera sensor 16. In some embodiments, the bottom side of the lens holder 12 may refer to the side facing away from the opening for the camera assembly, and the top side of the lens holder 12 may refer to the side facing towards the opening for the camera assembly.

The camera assembly 10 may further include an infrared filter 18 disposed in the lens holder 12. The ambient light may be transmitted through the lens 14, the light transmission channel 121, and the infrared filter 18, and further incident into the camera sensor 16 and the ambient light sensor 17.

In this embodiment, the infrared filter 18 may be disposed at a top side of the receiving space 123 of the lens holder 12. That is, the infrared filter 18 may be disposed on a side face of the receiving space 123 that faces towards the side of the camera sensor 16. The infrared filter 18 and the lens 14 may cover two opposite sides of the light transmission channel 121. The camera sensor 16 may be spaced from the infrared sensor 18.

The ambient light sensor 17 may be embedded in the inner side of the camera sensor 16, and the ambient light sensor 17 may be attached to a surface of the camera sensor 16 that faces towards the light transmission channel 121, that is, the ambient light sensor 17 may be attached to a surface of the camera sensor 16 that faces towards the lens 14. An insertion hole 162 may be defined at one side of the camera sensor 16 that faces towards the light transmission channel 121. The ambient light sensor 17 may be embedded in the insertion hole 162. In some embodiments, the insertion hole 162 may be defined in the middle of the surface of the camera sensor 16 that faces towards the light transmission channel 121. That is, a central axis of the insertion hole 162 may be aligned with the axis L of the lens 14.

In other embodiments, the central axis of the insertion hole 162 may also be offset from the axis L of the lens 14, as long as the insertion hole 162 corresponds to the light transmission channel 121, which means the projection of the ambient light sensor 17 on a plane substantially perpendicular to the axis L is located in the light transmission channel 121.

The camera assembly 10 may further include a lens cover 19, the lens cover 19 may cover the lens holder 12, and may be configured to prevent dust or impurities from entering the lens 14. A light incident hole 191 corresponding to the lens 14 may be defined in the middle of the lens cover 19. The ambient light may be incident into the lens 14 from the light incident hole 191. In some embodiments, the lens cover 19 may be made of transparent material.

As shown in FIG. 2, the camera sensor 16 may further include a wiring layer 163 and a plurality of photodiodes 165 arrayed on the wiring layer 163. The insertion hole 162 may be defined in the wiring layer 163 by the plurality of the photodiodes 165. The insertion hole 162 may be configured to receive the ambient light sensor 17. That is to say, no photodiode 165 is disposed in a position on the wiring layer 163 that corresponds to the ambient light sensor 17, in order to define the insertion hole 162. The ambient light sensor 17 may be received in the insertion hole 162.

In this embodiment, the camera sensor 16 and the ambient light sensor 17 may share an I2C bus.

When using the camera assembly 10, the camera assembly 10 may be firstly mounted in a housing of an electronic device, and a hole corresponding to the lens of the camera assembly 10 may be defined in the housing. During the photographing, an optical image of an object to be photographed may be projected onto the camera sensor 16 via the lens 14. The camera sensor 16 may convert the optical image into an electrical signal. The electrical signal may be further converted into a digital signal by means of analog-to-digital conversion. The digital signal may be further processed by a DSP and sent to a processor of the electronic device for processing, such that the digital signal may be converted into an image that can be seen on the display screen of the electronic device. The ambient light sensor 17 may sense the ambient light transmitted through the opening for the camera assembly, the lens 14 and the light transmission channel 121, and further send a signal to the processor of the electronic device. The processor may receive the signal and adjust the backlight luminance of the display screen of the electronic device.

Since the ambient light sensor 17 is disposed on the camera sensor 16, only one opening for the camera assembly is required to be defined in the housing of the electronic device having the camera assembly 10, and there is no need to define another opening for the ambient light sensor. In this way, the housing of the electronic device may have a better integrity, and the production cost for defining the opening for the ambient light sensor may be saved. Besides, the ambient light sensor does not occupy the inner space of the housing of the electronic device, which facilitates the arrangement of electronic components in the housing. Further, it is beneficial to the increase of the screen ratio of the electronic device.

Figure 3:
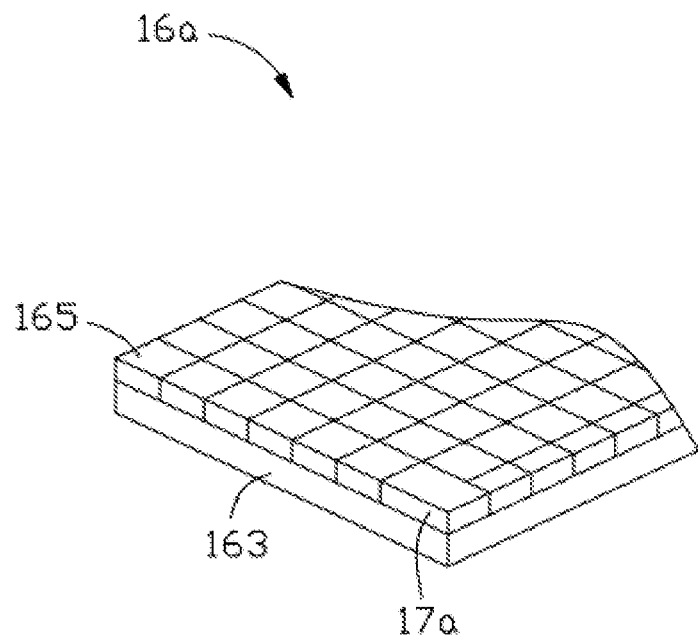
FIG. 3 is a partial perspective structural view of a camera sensor according to a second embodiment of the present disclosure.

FIG. 3 is a partial perspective structural view of a camera sensor according to a second embodiment of the present disclosure. As shown in FIG. 3, the structure of the camera sensor in the second embodiment of the present disclosure is similar to that of the camera sensor in the first embodiment, except that in the second embodiment, one of the plurality of photodiodes disposed on the wiring layer 163 and aligned with the light transmission channel 121 in the first embodiment may be set as the ambient light sensor 17a. That is, during the design and manufacturing of the camera sensor 16a, one of the plurality of photodiodes of the camera sensor 16 may be set as the ambient light sensor. When using the camera assembly, the ambient light may be transmitted through the lens 14, the light transmission channel 121, and the infrared filter 18, and further incident into the camera sensor 16. One of the plurality of photodiodes may sense the ambient light. That is to say, the ambient light sensor 17a may sense the ambient light, and further send the signal to the processor of the electronic device. The process may further receive the signal and adjust the backlight luminance of the display. Other photodiodes on the camera sensor 16 may be configured for photographing.

Figure 4:
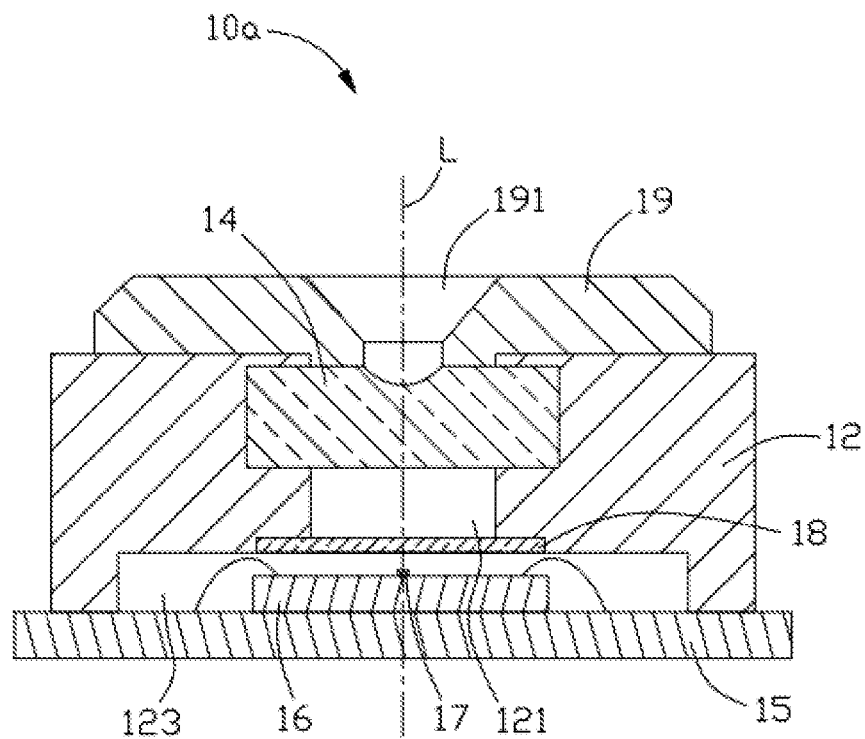
FIG. 4 is a schematic structural view of a camera assembly according to a third embodiment of the present disclosure.

FIG. 4 is a schematic structural view of a camera assembly according to a third embodiment of the present disclosure. As shown in FIG. 4, the structure of the camera assembly in the third embodiment of the present disclosure is similar to that of the camera assembly in the first embodiment, except that in the third embodiment, the ambient light sensor 17 of the camera assembly 10a may be disposed on the surface of the camera sensor 16 that faces towards the light transmission channel 121 or the lens 14. A center of the ambient light sensor 17 may be aligned with the axis L of the lens 14. The ambient light sensor 17 may be electrically connected to the circuit board 15.

Figure 5:
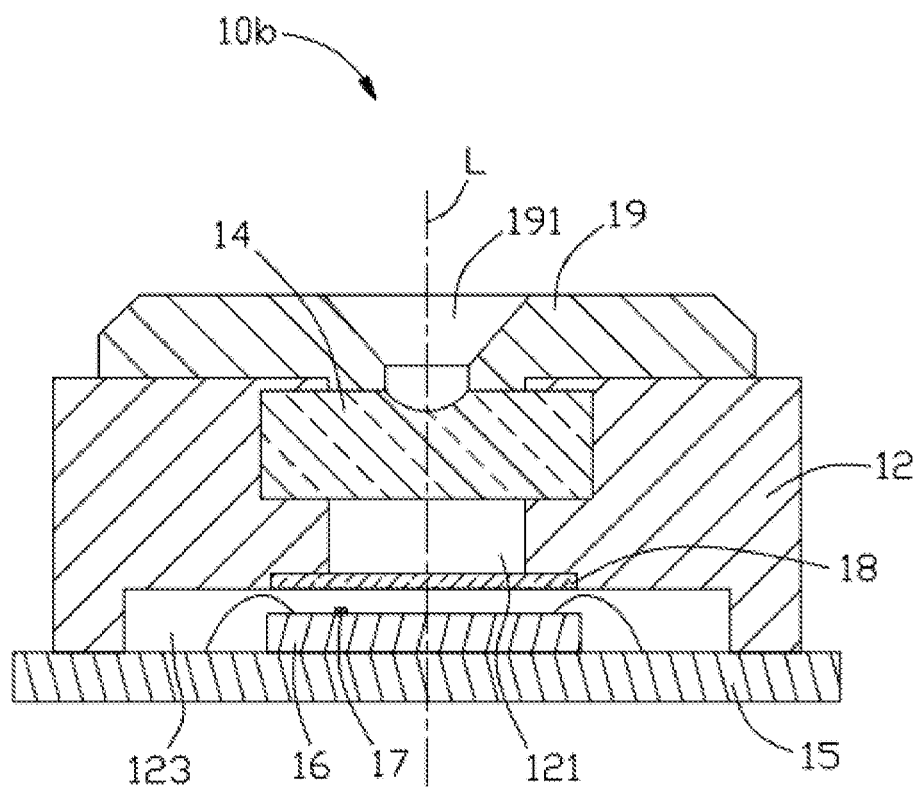
FIG. 5 is a schematic structural view of a camera assembly according to a fourth embodiment of the present disclosure.

FIG. 5 is a schematic structural view of a camera assembly according to a fourth embodiment of the present disclosure. As shown in FIG. 5, the structure of the camera assembly in the fourth embodiment of the present disclosure is similar to that of the camera assembly in the third embodiment, except that in the fourth embodiment, the ambient light sensor 17 of the camera assembly 10b may be disposed on the surface of the camera sensor 16 that faces towards the light transmission channel 121, but the ambient light sensor 17 may be offset from the axis L of the lens 14, as long as the ambient light sensor 17 corresponds to the light transmission channel 121, which means the projection of the ambient light sensor 17 on a plane substantially perpendicular to the axis L is located in the light transmission channel 121.

Figure 6:
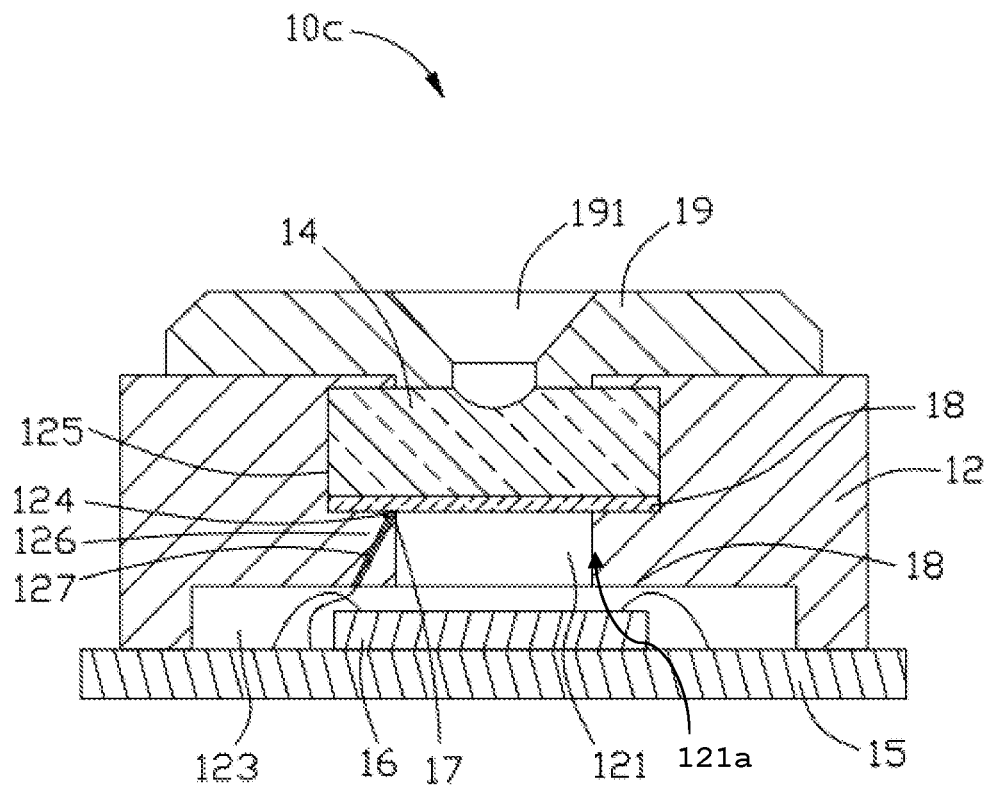
FIG. 6 is a schematic structural view of a camera assembly according to a fifth embodiment of the present disclosure.

FIG. 6 is a schematic structural view of a camera assembly according to a fifth embodiment of the present disclosure. As shown in FIG. 6, the structure of the camera assembly in the fifth embodiment of the present disclosure is similar to that of the camera assembly in the first embodiment, except that in the fifth embodiment, a receiving hole 124 adjacent to the light transmission channel 121 may be further defined in the lens holder 12 of the camera assembly 10c. The ambient light sensor 17 may be received in the receiving hole 124. The ambient light may be transmitted through the lens 14, and further incident into the ambient light sensor 17. A mounting space 125 may be further defined in the middle at a side face of the lens holder 12 that faces away from the camera sensor 16. The mounting space 125 may communicate with the light transmission channel 121, and the lens 14 may be received in the mounting space 125. A stepped portion 126 may be formed in the light transmission channel 12 of the lens holder 12 and between the mounting space 125 and the receiving space 123.

More specifically, the lens holder 12 may include an inner peripheral wall 121a defined in (also forming) the light transmission channel 121. The stepped portion 126 may be formed in the light transmission channel 12 of the lens holder 12 at one end of the inner peripheral wall 121a that is adjacent to the lens 14. In this embodiment, the receiving hole 124 may be defined at the side of the stepped portion 126 that faces away from the camera sensor 16. The receiving hole 124 may be disposed adjacent to the light transmission channel 121, and the ambient light sensor 17 may be received in the receiving hole 124. That is to say, the ambient light sensor 17 may be disposed in the stepped portion 126.

The infrared filter 18 may be further disposed on the stepped portion 126, and attached to the lens 14. The infrared filter 18 may cover the ambient light sensor 17, and the lens 14 may be disposed on the infrared filter 18.

In other embodiments, the receiving hole 124 may also be defined at one side of the stepped portion 126 that faces away from the camera sensor .16 and further disposed away from the light transmission channel 121, as long as the ambient light is capable of being transmitted through the lens 14 and the infrared filter 18, and further incident into the ambient light sensor 17 received in the receiving hole 124.

A through slot 127 may be defined in the lens holder 12, and the through slot 127 may communicate with the receiving hole 124 and the receiving space 123. The ambient light sensor 17 may be electrically connected to the circuit board 15 via a wire running through the through slot 127.

When using the camera assembly, the camera assembly 10c is mounted on the electronic device. The ambient light may be transmitted through the opening for the camera assembly, the lens 14, and the infrared filter 18, and further incident into the ambient light sensor 17. The ambient light sensor 17 may sense the ambient light, and further send the signal to the processor of the electronic device. The process may further receive the signal and control the backlight luminance of the display screen of the electronic device. In this way, it is possible to reduce the power consumption of the electronic device, and the display screen is capable of displaying a soft picture.

Since the ambient light sensor 17 of the camera assembly 10c of the present disclosure is disposed on the stepped portion 126 of the lens holder 12, it is convenient for the ambient light sensor 17 to sense the ambient light outside the camera assembly 10c. Moreover, the ambient light sensor 17 will not block the camera sensor 16, which facilitates the photographing of the camera assembly 10c.

Figure 7:
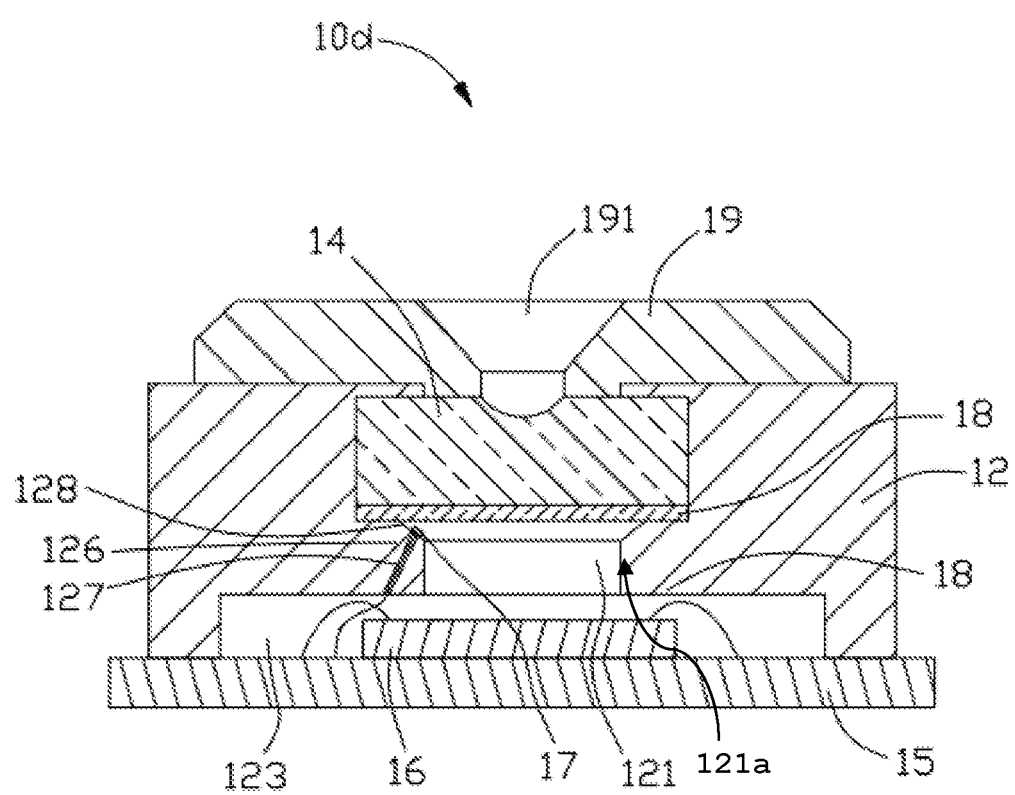
FIG. 7 is a schematic structural view of a camera assembly according to a sixth embodiment of the present disclosure.

FIG. 7 is a schematic structural view of a camera assembly according to a sixth embodiment of the present disclosure. As shown in FIG. 7, the structure of the camera assembly in the sixth embodiment of the present disclosure is similar to that of the camera assembly in the fifth embodiment, except that in the sixth embodiment, in the lens holder 12 of the camera assembly 10d, a chamfer 128 may be formed in the lens holder 12 and disposed at one end of the inner peripheral wall 121a that faces towards the lens 14 (also adjacent to the lens 14). The ambient light sensor 17 may be attached to a surface of the chamfer 128. That is to say, the chamfer 128 may be formed at the junction between the side face of the stepped portion 126 that faces towards the lens 14 and the inner peripheral wall 121a of the light transmission channel 121, and the ambient light sensor 17 may be attached to the surface of the chamfer 128. The through slot 127 may be defined in the lens holder 12. In this case, the through slot 127 may communicate with the receiving space 123, and further extend to the surface of the chamfer 128. The ambient light sensor 17 may be electrically connected to the circuit board 15 via a wire running through the through slot 127.

When using the camera assembly 10, the camera assembly 10d is mounted in an electronic device. The ambient light may be transmitted through the opening for the camera assembly, the lens 14, and the infrared filter 18, and further incident into the ambient light sensor 17. The ambient light sensor 17 may sense the ambient light, and further send the signal to the processor of the electronic device. The process may further receive the signal and control the backlight luminance of the display screen of the electronic device. In this way, it is possible to reduce the power consumption of the electronic device, and the display screen is capable of displaying a soft picture.

Since the ambient light sensor 17 of the camera assembly 10d of the present disclosure is disposed on the chamfer 128 of the stepped portion 126 of the lens holder 12, the ambient light sensor 17 can sense more ambient light outside the camera assembly 10c. Moreover, the ambient light sensor 17 will not block the camera sensor 16, which facilitates the photographing of the camera assembly 10c.

In other embodiments, a notch may be defined at the junction between the side face of the stepped portion 126 that faces towards the lens 14 and the inner peripheral wall 121a of the light transmission channel 121. The ambient light sensor 17 may be received in the notch. The ambient light may be transmitted through the opening for the camera assembly, the lens 14, and the infrared filter 18, and further incident into the ambient light sensor 17.

Figure 8:
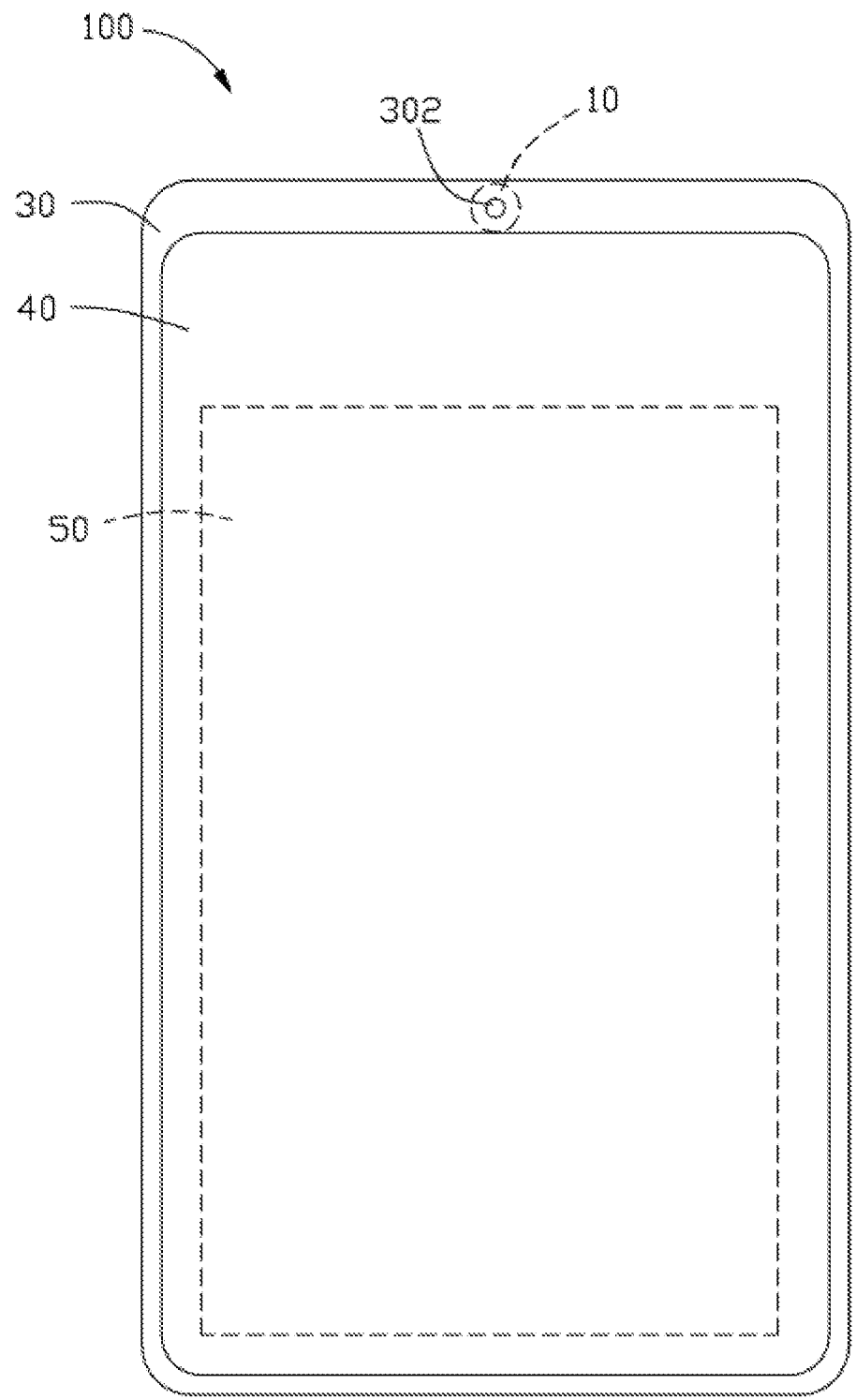
FIG. 8 is a schematic structural view of an electronic device according to a seventh embodiment of the present disclosure.

FIG. 8 is a schematic structural view of an electronic device according to a seventh embodiment of the present disclosure. As shown in FIG. 8, the electronic device 100 may include a housing 30, a screen 40 disposed on a front face of the housing 30, a main board 50 disposed in the housing 30, and the camera assembly 10 described in any embodiment above. An opening 302 for the camera may be defined at the top of the display screen 40 on the front face of the housing 30. The camera assembly 10 may be mounted in the housing 30. The lens of the camera assembly 10 may be aligned with the opening 302. The circuit board of the camera assembly 10 may be electrically connected to the main board 50.

In this embodiment, the electronic device 100 may be a smart phone, and the camera component 10 may be a front camera of the smart phone.

When using the electronic device 100, the ambient light around the electronic device 100 may be transmitted through the opening 302, the lens, the infrared filter, and the light transmission channel, and further incident into the ambient light sensor. The ambient light sensor may sense ambient light and further send a signal to a processor on the main board 50. The processor may receive the signal and adjust the backlight luminance of the display screen 40. In this way, it is possible to reduce the power consumption of the electronic device 100, and the display screen 40 is capable of displaying a soft picture.

When it is required to use the electronic device 100 to photograph, an optical image of an object to be photographed may be projected onto the camera sensor via the lens of the camera assembly 10. The camera sensor may convert the optical image into an electrical signal. The electrical signal may be further converted into a digital signal by means of analog-to-digital conversion. The digital signal may be further processed by the DSP, and then sent to the processor on the main board 50 for processing, such that the digital signal may be converted into the image that can be seen on the display screen of the electronic device 100.

Since the front face of the housing 30 defines only the opening 302 for the camera, and the ambient light sensor is integrated into the camera assembly 10, it is possible that the housing 30 has a better integrity, and the production cost for defining the opening for the ambient light sensor may be saved. Besides, the ambient light sensor does not occupy the inner space of the housing 30 of the electronic device, which facilitates the arrangement of electronic components in the housing. Further, it is also possible to increase the screen ratio of the electronic device 100.

In other embodiments, the camera assembly 10a, 10b, 10c or 10d may be mounted in the housing 30.

The above is an embodiment of the present disclosure. It should be noted that, those skilled in the art can also make several improvements and modifications without departing from the principles of the present disclosure. All these shall be covered within the protection scope of the present disclosure.

What is claimed is:

1. A camera assembly, comprising:
a lens holder, defining a light transmission channel; wherein an inner peripheral wall is defined in the light transmission channel, and a chamfer is formed in the lens holder and disposed at one end of the inner peripheral wall that faces towards the lens;
a lens, disposed in the lens holder;
a circuit board;
a camera sensor, disposed on the circuit board and corresponding to the lens via the light transmission channel; and
an ambient light sensor, electrically connected to the circuit board and attached to a surface of the chamfer;
wherein ambient light is transmitted through the lens and the light transmission channel, and further incident into the camera sensor and the ambient light sensor.

2. The camera assembly of claim 1, wherein a through slot is defined in the lens holder; a wire runs through the through slot and is further electrically connected between the ambient light sensor and the circuit board.

3. The camera assembly of claim 1, wherein the ambient light sensor is a photodiode or a photoresistor.

4. The camera assembly of claim 1, wherein the camera sensor and the ambient light sensor share an I2C bus.

5. The camera assembly of claim 1, further comprising an infrared filter disposed on the lens holder; wherein the ambient light is transmitted through the infrared filter and further incident into the camera sensor and the ambient light sensor.

6. An electronic device, comprising:
a housing, defining an opening; and
a camera assembly, mounted in the housing and comprising:
a lens holder, defining a light transmission channel; wherein an inner peripheral wall is defined in the light transmission channel, and a chamfer is formed in the lens holder and disposed at one end of the inner peripheral wall that faces towards the lens;
a lens, disposed in the lens holder and aligned with the opening;
a circuit board;
a camera sensor, disposed on the circuit board and corresponding to the lens via the light transmission channel; and
an ambient light sensor, electrically connected to the circuit board and attached to a surface of the chamfer;
wherein ambient light is transmitted through the lens and the light transmission channel, and further incident into the camera sensor and the ambient light sensor.

7. The electronic device of claim 6, wherein a through slot is defined in the lens holder; a wire runs through the through slot and is further electrically connected between the ambient light sensor and the circuit board.

8. The electronic device of claim 6, wherein the ambient light sensor is a photodiode or a photoresistor.

9. The electronic device of claim 6, wherein the camera sensor and the ambient light sensor share an I2C bus.

10. The electronic device of claim 6, further comprising an infrared filter disposed on the lens holder; wherein the ambient light is transmitted through the infrared filter and further incident into the camera sensor and the ambient light sensor.

* * * * *